United States Patent [19]
Allen et al.

[11] Patent Number: 5,704,041
[45] Date of Patent: Dec. 30, 1997

[54] OBJECT INDEPENDENT SCOPING IN AN OPEN SYSTEM INTERCONNECTION SYSTEM

[75] Inventors: Wade C. Allen, Durham; Jeremy Philip Goodwin, Raleigh, both of N.C.; Robert Louis Nielsen, Zumikon, Switzerland; Paul Joseph Reder, Durham; Douglas Toltzman, Hubert, both of N.C.

[73] Assignee: International Business Machines Corporation, Armonk, N.Y.

[21] Appl. No.: 310,134

[22] Filed: Sep. 21, 1994

[51] Int. Cl.$^6$ .................................................. G06F 13/42
[52] U.S. Cl. .................... 395/200.15; 395/200.01; 395/200.02; 395/200.05
[58] Field of Search ............... 395/200.15, 200.01, 395/200.02, 200.05

[56] References Cited

U.S. PATENT DOCUMENTS

| | | | |
|---|---|---|---|
| 5,252,986 | 10/1993 | Nickel | 395/600 |
| 5,295,256 | 3/1994 | Bapat | 395/500 |
| 5,317,742 | 5/1994 | Bapat | 395/700 |
| 5,452,433 | 9/1995 | Nihart et al. | 395/500 |
| 5,491,822 | 2/1996 | Allen et al. | 395/700 |
| 5,493,678 | 2/1996 | Arcuri et al. | 395/600 |
| 5,519,863 | 5/1996 | Allen et al. | 395/700 |

*Primary Examiner*—Alyssa H. Bowler
*Assistant Examiner*—Richard J. Gregson
*Attorney, Agent, or Firm*—Homer L. Knearl; Gerald R. Woods

[57] ABSTRACT

In an Open System Interconnection (OSI) environment, an agent Common Management Information Protocol (CMIP) platform maintains an up to date tree of all of the Managed Object Instances (MOIs), in order to perform scoping functions. The agent platform receives a message from an OSI manager which includes a base MOI and levels below the base MOI to receive the message. The agent platform recurses through the tree below the base MOI to determine which MOIs should receive the message. If the message is delete, the children of MOIs to be deleted are also deleted. The children of undeletable MOIs are not deleted. A current, accurate tree is maintained by the agent platform, which can register a new MOI in the tree when a valid request is received from the MOI or the manager. The agent platform can also deregister an MOI upon valid request from the agent associated with the platform.

7 Claims, 9 Drawing Sheets

FIG. 1B

FIG. 2
REGISTRATIONS

FIG. 3
DEREGISTRATIONS

OBJECT INDEPENDENT SCOPING IN AN OPEN SYSTEM INTERCONNECTION SYSTEM

BACKGROUND OF THE INVENTION

1. Field of the Invention

This invention is directed to managing certain operations between an Open Systems Interconnection (OSI) manager and agent running on a Common Management Information Protocol (CMIP) platform. More particularly, the invention relates to providing the ability in an agent CMIP platform to scope, or reference a set of managed object instances (objects).

2. Description of the Related Art

A manager application running in a first OSI computing system initiates requests relating to objects in an agent application running on a second OSI computing system. The manager application and the agent application each run on their own CMIP platform. The manager requests are communicated through its CMIP platform, through a network, through the agent's CMIP platform to the agent. Functions performed by the agent platform are at a separate program level from the agent application, so that these functions do not slow the application down.

The agent could represent a personal computer, for example. A managed object instance (MOI) is an object which represents some physical resource which is part of the agent such as a modem, an application program, or a computer card. Each MOI has "attributes" associated with it, such as baud rate or version number. When the manager wants to query the modem for its baud rate and perhaps change the baud rate, the manager does not want to query every single MOI within the agent.

Scoping is a function which narrows down which MOIs receive a given request. All of the MOIs have names, and the names form a hierarchy or tree laid out according to the managed object class templates and the name binding templates which are part of the Guidelines for Definition of Managed Objects (GDMO). A scope can then be defined to send the request to only the MOIs one level down from the top MOI, for example.

MOIs must be named and located in the tree according to the GDMO templates. A modem for a computer might be defined to be in the level right below the computer, which is the top node. If the computer is named rederpj, and this is the first modem added to it, the name might be defined to take the form rederpj.modem01.

There have been two approaches to scoping in the past. The first requires that all instances reside in the same process/application. New objects or instances cannot be added on the fly, without writing new code and recompiling the agent application. The second approach requires communication between all of the MOIs in the agent. This gets very expensive and complicated since the number of connections between "n" MOIs equals n(n-1)/2. A need remains in the art for a scoping method which resides on the agent platform and maintains a valid tree while objects are registered and deregistered.

SUMMARY OF THE INVENTION

An object of the present invention is to provide capability within an agent CMIP platform to scope which MOIs receive a message from a manager. The message from the manager includes information specifying the portion of the MOI tree which should receive the message. This information is generally the base MOI (BMOI) and the levels beneath the MOI to include.

The platform receives the message and parses it to determine which portion of the tree should receive the message. Then the platform recurses through the tree below the BMOI to find which MOIs should receive the message. The platform generates a list of the MOIs to receive the message and sends the message to those MOIs. If no MOIs are to receive the message, an error message is forwarded to the manager.

Generally the message will be GET, SET, delete, or action. If the message is delete, the platform must check each MOI to determine whether it is flagged not deletable. If an MOI is flagged not deletable, neither it, nor its children can be deleted. If an MOI is deleted, its children (if deletable) are also deleted.

The agent platform keeps an accurate and up to date tree of the MOIs by registering an MOI upon valid request from the MOI or the manager, and deleting an MOI upon valid request from the agent.

Those having normal skill in the art will recognize the foregoing and other objects, features, advantages and applications of the present invention from the following more detailed description of the preferred embodiments as illustrated in the accompanying drawings.

DESCRIPTION OF THE PREFERRED EMBODIMENTS

Figure 1A:
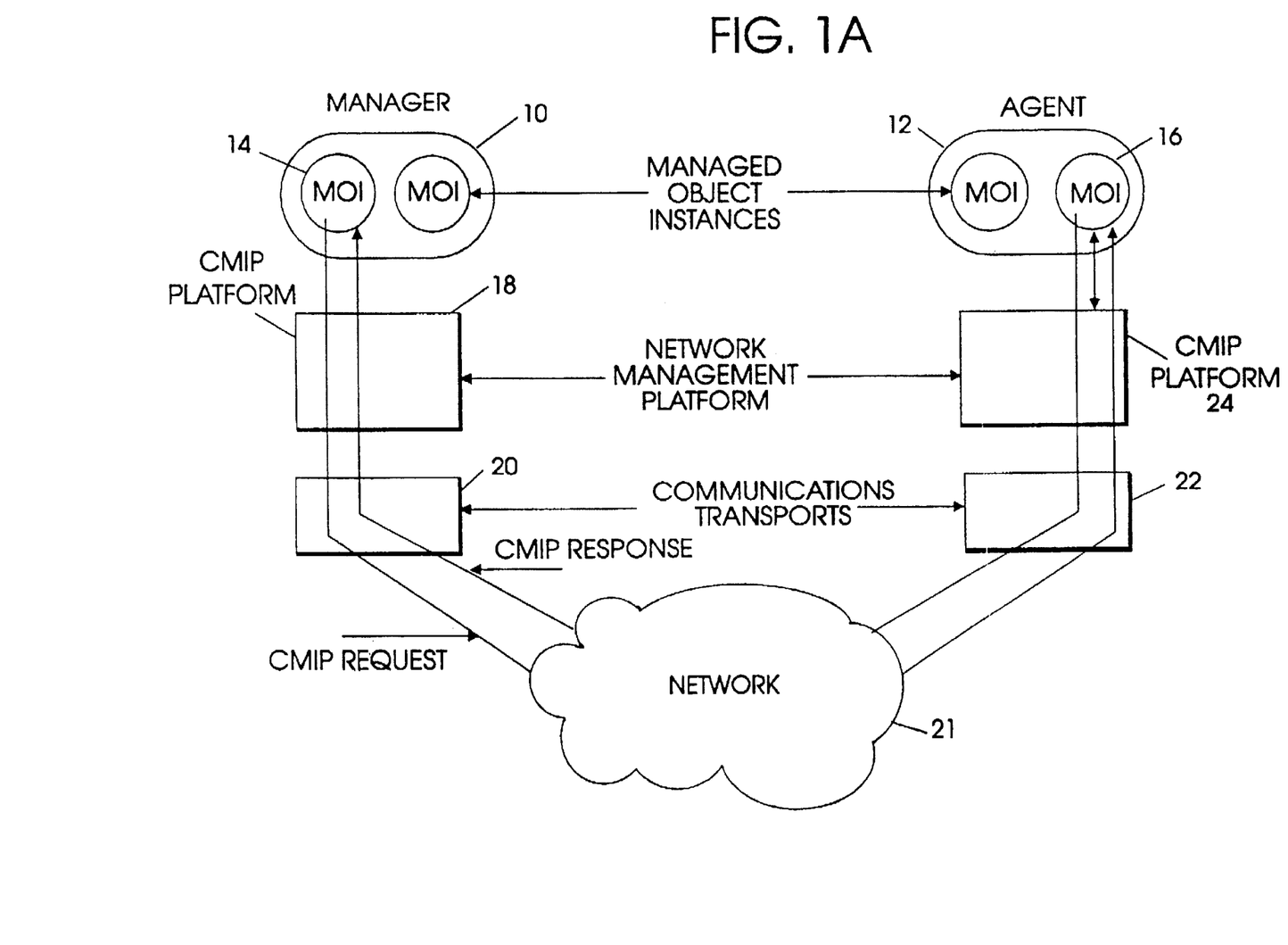
FIG. 1A is an overview of a manager application running on a CMIP platform connected by a communications network to an agent application running on a second CMIP platform.
Figure 1B:
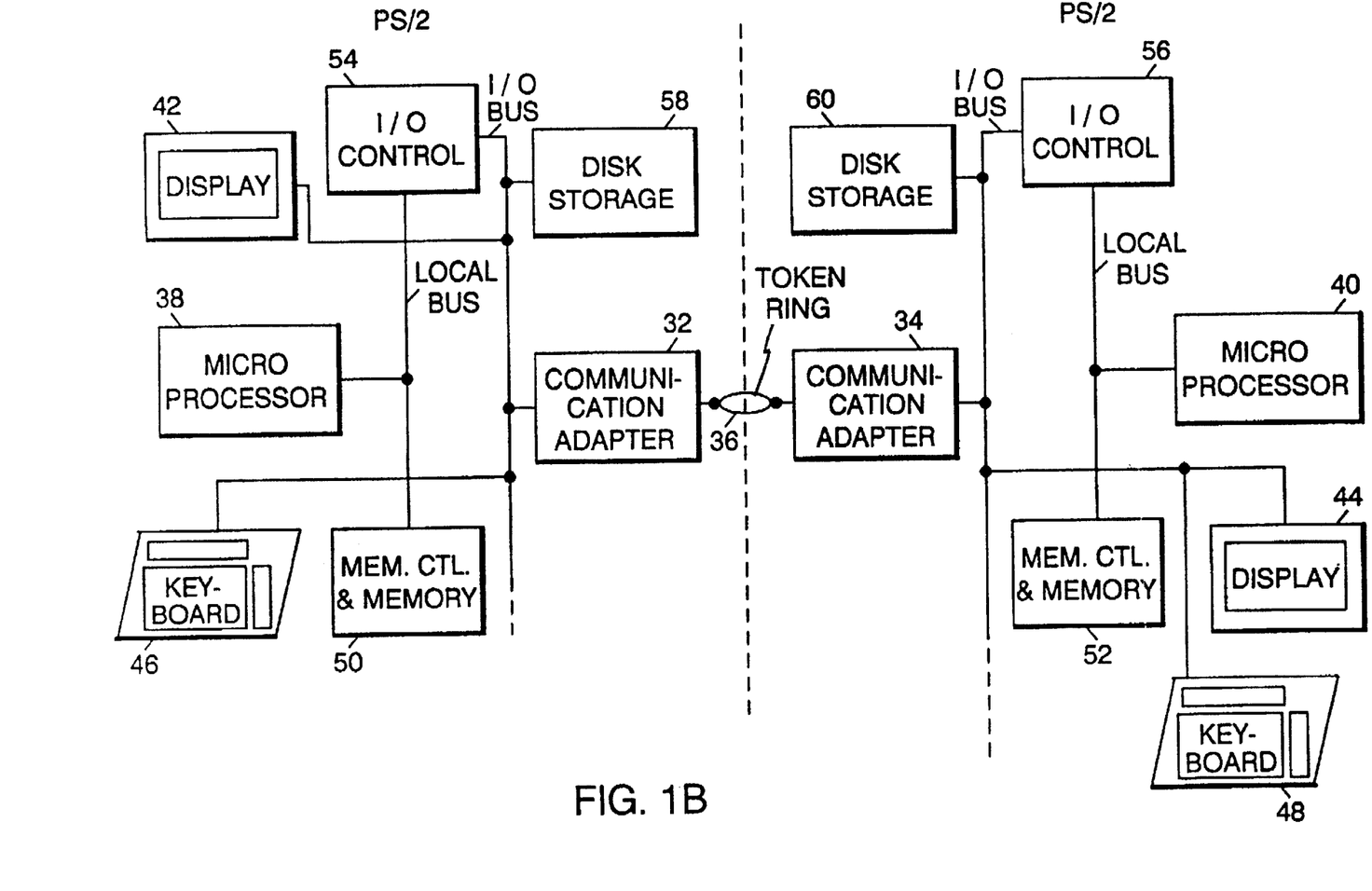
FIG. 1B illustrates one example of the computing systems upon which the CMIP platforms and manager and agent application programs are running.

FIGS. 1A and 1B show the environment in which the present invention operates. In FIG. 1A, the manager application 10 is running on an operating system in a first computing system. The agent application 12 is running on an operating system in a second computing system. While this is a typical configuration for manager and agent applications, it is also possible to run the manager and agent applications on the same computing system. A managed object instance 14, in the manager application 10, communicates requests to a managed object instance 16 in agent 12. Viewing the systems from a software perspective, the requests are passed through the CMIP platform 18 and communication transport 20 in the system where the manager resides. The communication transport 20 sends the requests over a communication network 21 to the communications transport 22 at the agent's computing system. Finally, requests are handled by the CMIP platform 24 working with the agent 12 and the MOI 16. Replies or responses from MOI 16 in the agent 12 are passed back to the manager MOI 14 via CMIP platform 24, transport 22, network 21 and transport 20, and CMIP platform 18.

The manager and application programs in FIG. 1A run on an operating system in an appropriate OSI computing system. FIG. 1B is exemplary of hardware to implement the invention. The open systems are IBM Personal System/2 computers (two computing systems are shown) connected to each other through communication adapters 32 and 34 via a token ring local area network 36. The communication adapter is connected to the I/O bus in each PS/2 computer. Each PS/2 computer has a local bus and an I/O bus. FIG. 1B shows two PS/2 computing systems having similar components. The local bus interconnects the microprocessor 38, 40, memory and memory control 50, 52 and I/O bus through I/O control 54, 56. The I/O control through the I/O bus provides access to the I/O devices, such as the display 42, 44, the keyboard 46, 48, disk storage 58, 60, the communication adapters 32, 34, printers (not shown), etc. The operating system running on this hardware is OS/2, and the communication software running on OS/2 is the OS/2 Communication Manager. The manager and agent application programs run on top of the CMIP platform. The CMIP platform runs on top of the OS/2 Communication Manager which, in turn, runs on top of the OS/2 operating system program. The communication transports of FIG. 1A are in the OS/2 Communication Manager.

While the invention is implemented in this preferred embodiment on PS/2 computers running the OS/2 operating system, any number of other open computing systems and platforms might be used, such as the IBM RS/6000 running AIX operating system, the IBM AS/400 running OS/400 operating system, or IBM System 390 running MVS or other operating systems.

Figure 2:
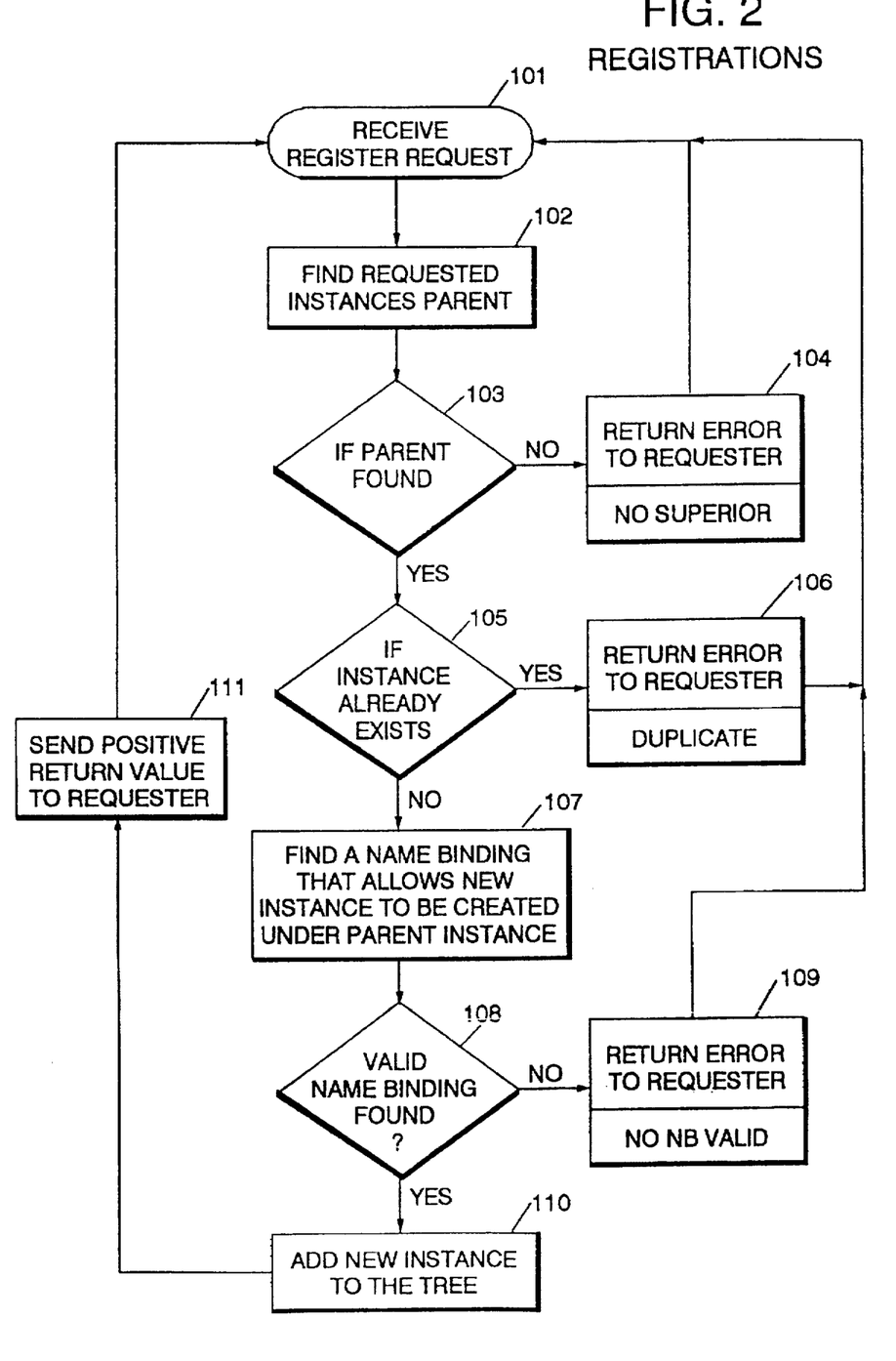
FIG. 2 is a flow diagram of the agent platform processing a register request.

FIG. 2 shows the process flow within the agent platform 24 upon receiving a register MOI request, either from the MOI at the agent application 12 running on top of the platform 24, or from the manager 10. At step 101, the register request is received. Prior to sending the request on to the agent, platform 24 has to validate the name that the manager is requesting to create. If, for example, the requester is requesting to create modem02 under system rederpj, platform 24 at decision 102 verifies that there is a MOI called rederpj. If not, an error message is sent to the requester at operation 104 that states that the superior object instance could not be found. Decision 105 makes sure the requested instance (modem02) does not already exist. If it does, operation 106 sends an error message that indicates that the requested name was a duplicate of a name that already existed. Operation 107 attempts to find a name binding that will allow platform 24 to create modem02 under system rederpj. Decision 108 checks whether a valid name binding was found. If not, an error message is sent at step 109 that indicates that platform 24 did not find a valid name binding.

If the above tests were successful, operation 110 adds the instance to the tree, or naming hierarchy, within platform 24. If the requester is manager 10, step 110 also performs another function. It sends the create request up to the agent application, so that the agent application knows that this new instance has been created. This extra step is unnecessary if the requester was an MOI within agent 12. As far as the platform 24 is concerned, the instance has been added to the tree by step 110. Operation 111 sends a positive return value to the requester indicating that the instance was created.

There are two things that can happen after step 111. Either the create process at the agent completes successfully, or the agent sends back a deregister. Since the registration process in CMIP platform 24 has assumed a successful registration, agent 12 must deregister the new managed object instance if the creation process at the agent is unsuccessful.

Figure 3:
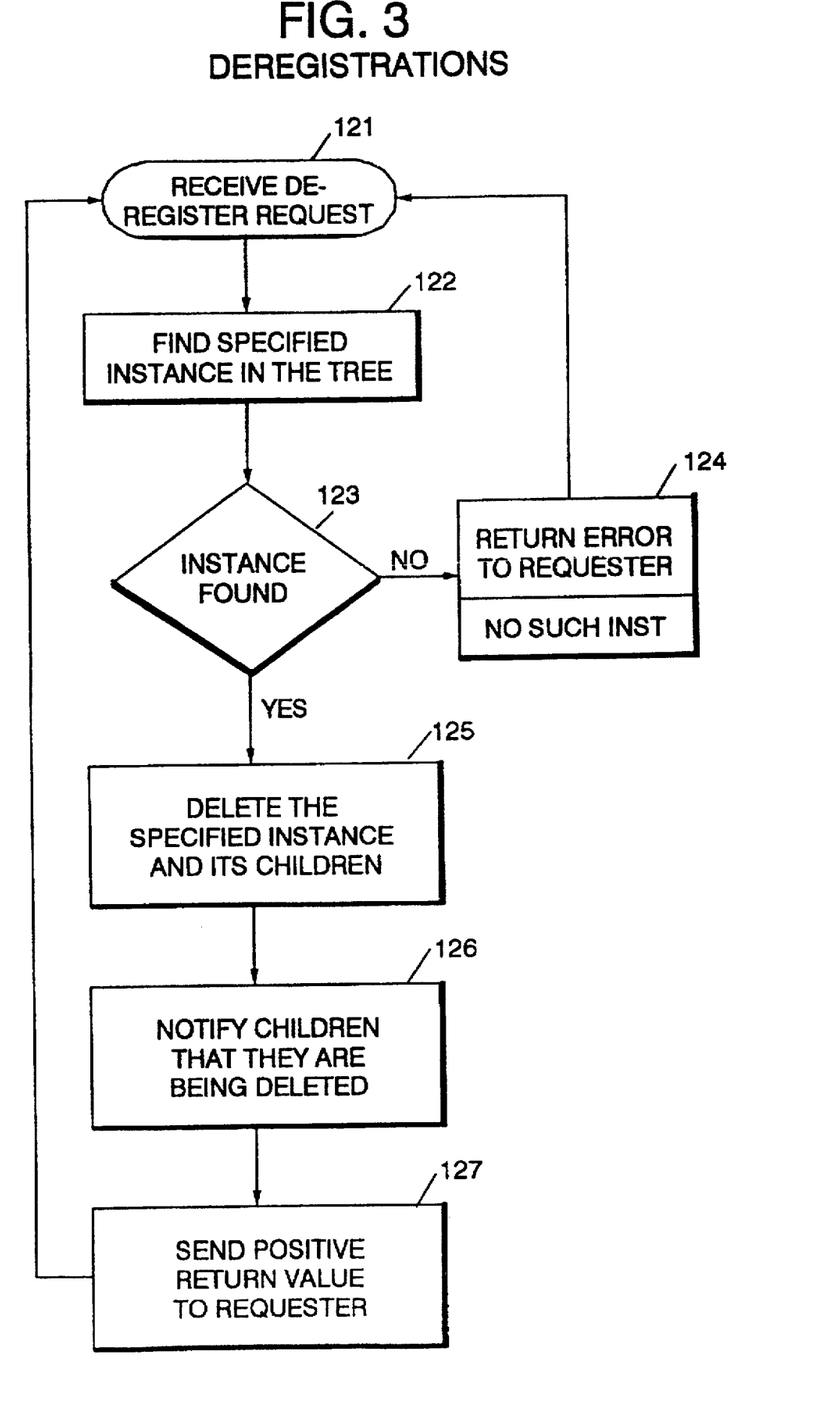
FIG. 3 is a flow diagram of the agent platform processing a deregister request.

FIG. 3 illustrates the process of deregistration within platform 12. Tree validity must be maintained when managed object instances are removed. Step 121 receives the deregister request from agent 12. In step 122, the registration process in platform 24 finds the specific instance to deregister in the tree. A deregister request contains the full name of what it wants to deregister, e.g. rederpj.modem01. Step 122 consists of, first, finding the parent rederpj, then finding a child under that parent called modem01. If the instance is not found in decision 123, an error message is returned in step 124 to the requester indicating there is no such instance. If the instance is found, then operation 125 removes that instance from the platform version of the tree, and, in addition, removes all children of the instance from the tree. Step 126 tells all of the children that they are being deleted. Step 127 sends a positive response back to the requester indicating that the delete has been performed successfully.

After the process of either FIG. 2 or FIG. 3, the tree is in a valid state. If a new request comes in, the platform will be able to use this tree to either validate a new create or process a new deregistration, or process another message (a GET or a SET), and the platform will be able to determine the scope of the request.

A deregistration request only comes from the agent 12. The "delete" request comes from the manager. A local deregister from agent 12 can be handled simply, as shown in FIG. 3, because the request refers to a specific managed object instance, and does not contain a scope. A delete request from manager 10, on the other hand, can refer to a scoped collection of instances.

Figure 4:
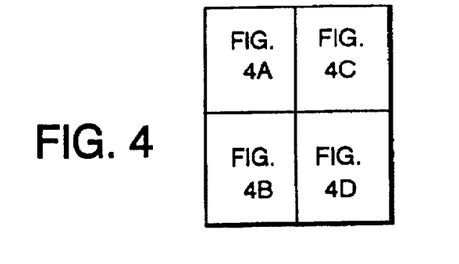
FIG. 4 show the layout of the flow diagrams of FIG. 4A, 4B, 4C, and 4D illustrating scoping within the agent platform.
Figure 4A:
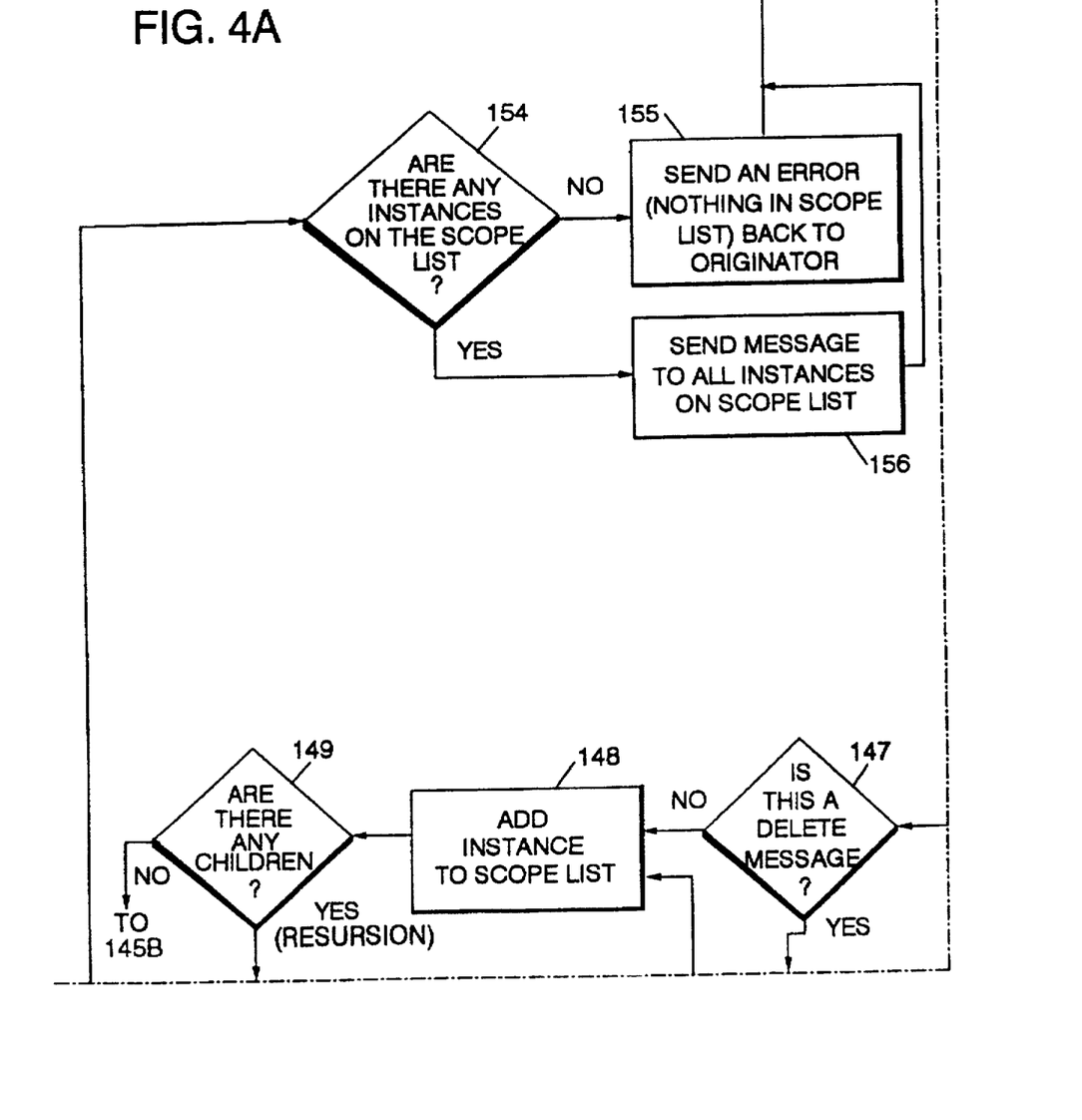
FIGS. 4A–4D are flow diagrams illustrating scoping within the agent platform.
Figure 4B:
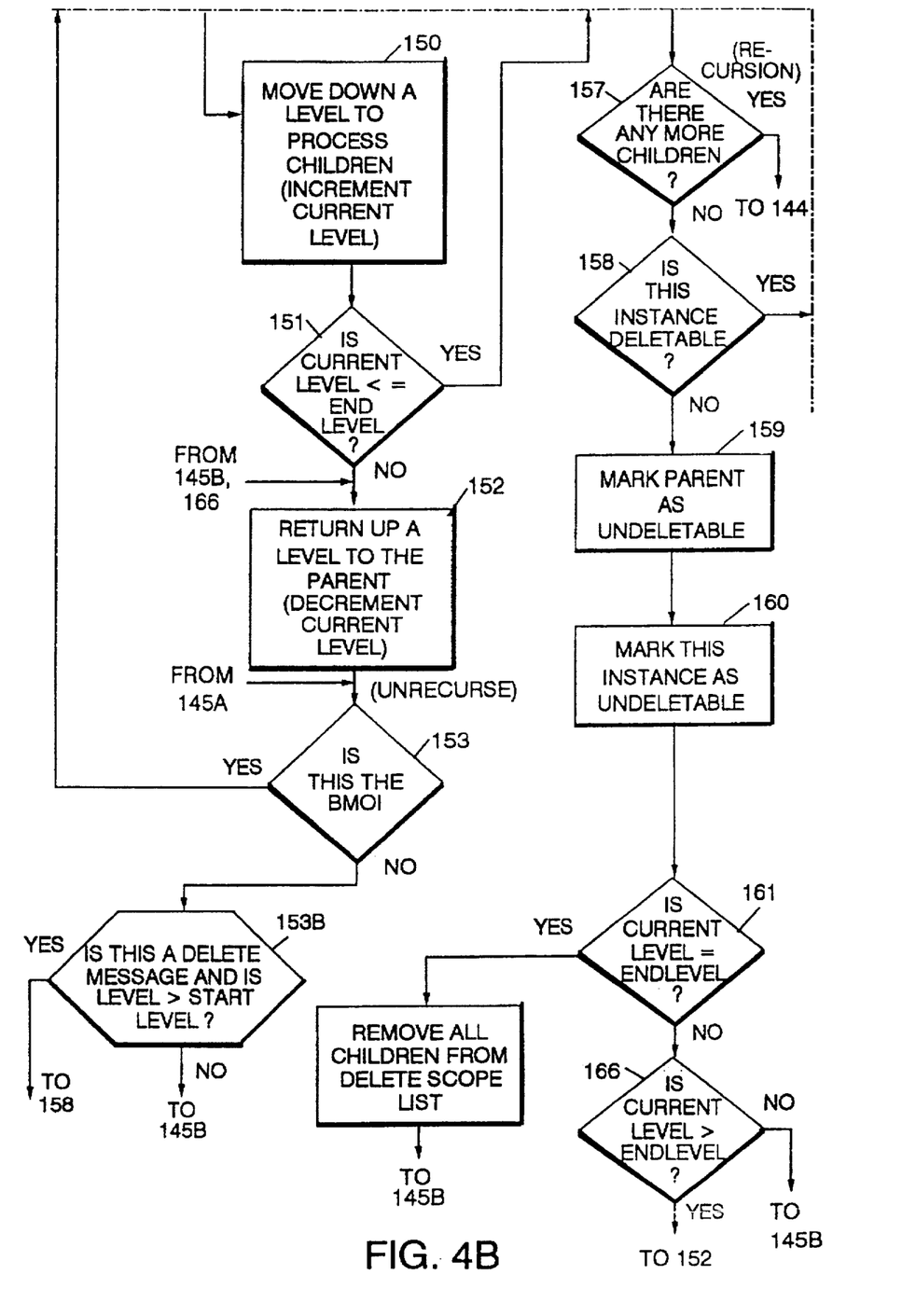
Figure 4C:
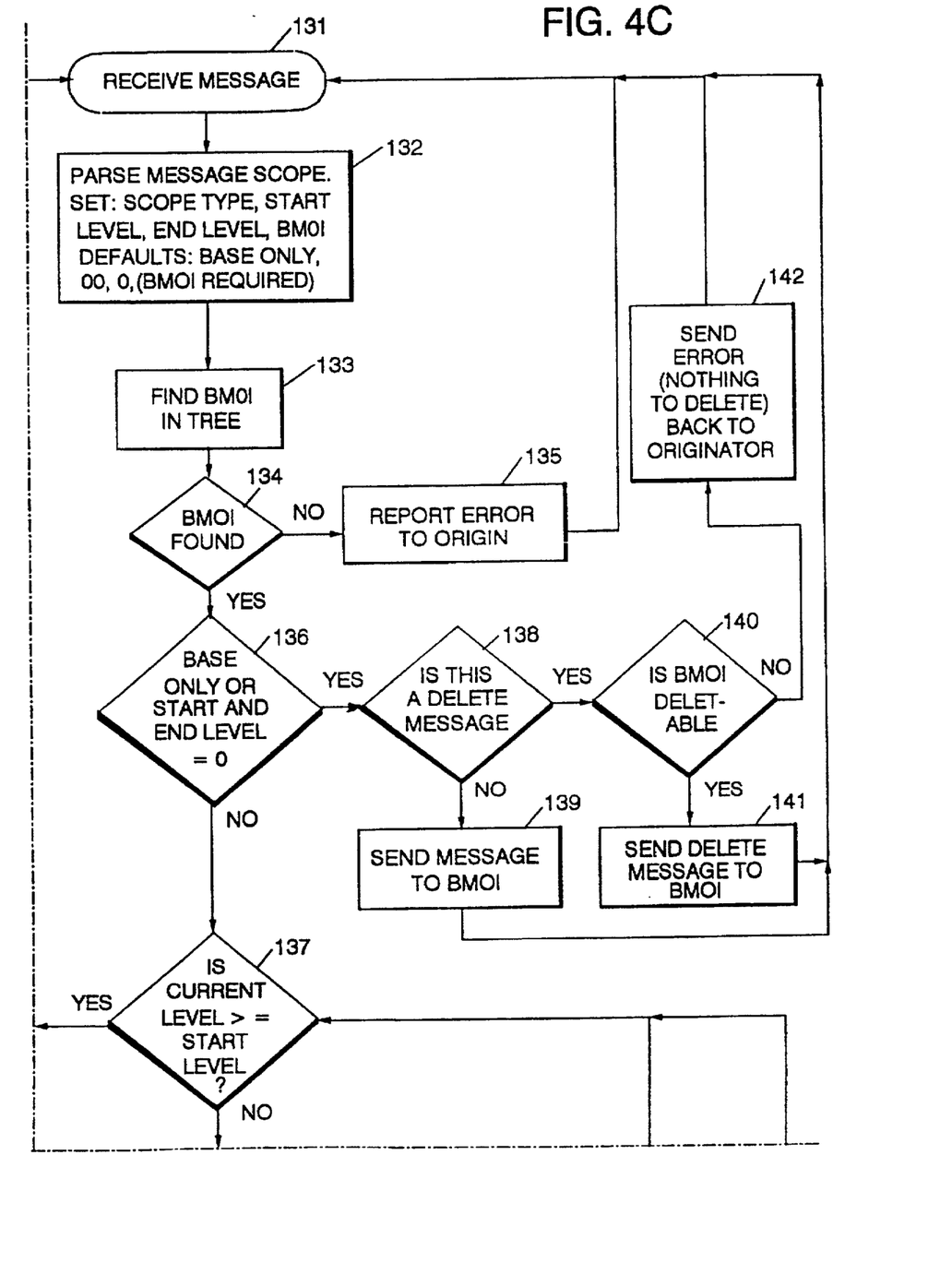
Figure 4D:
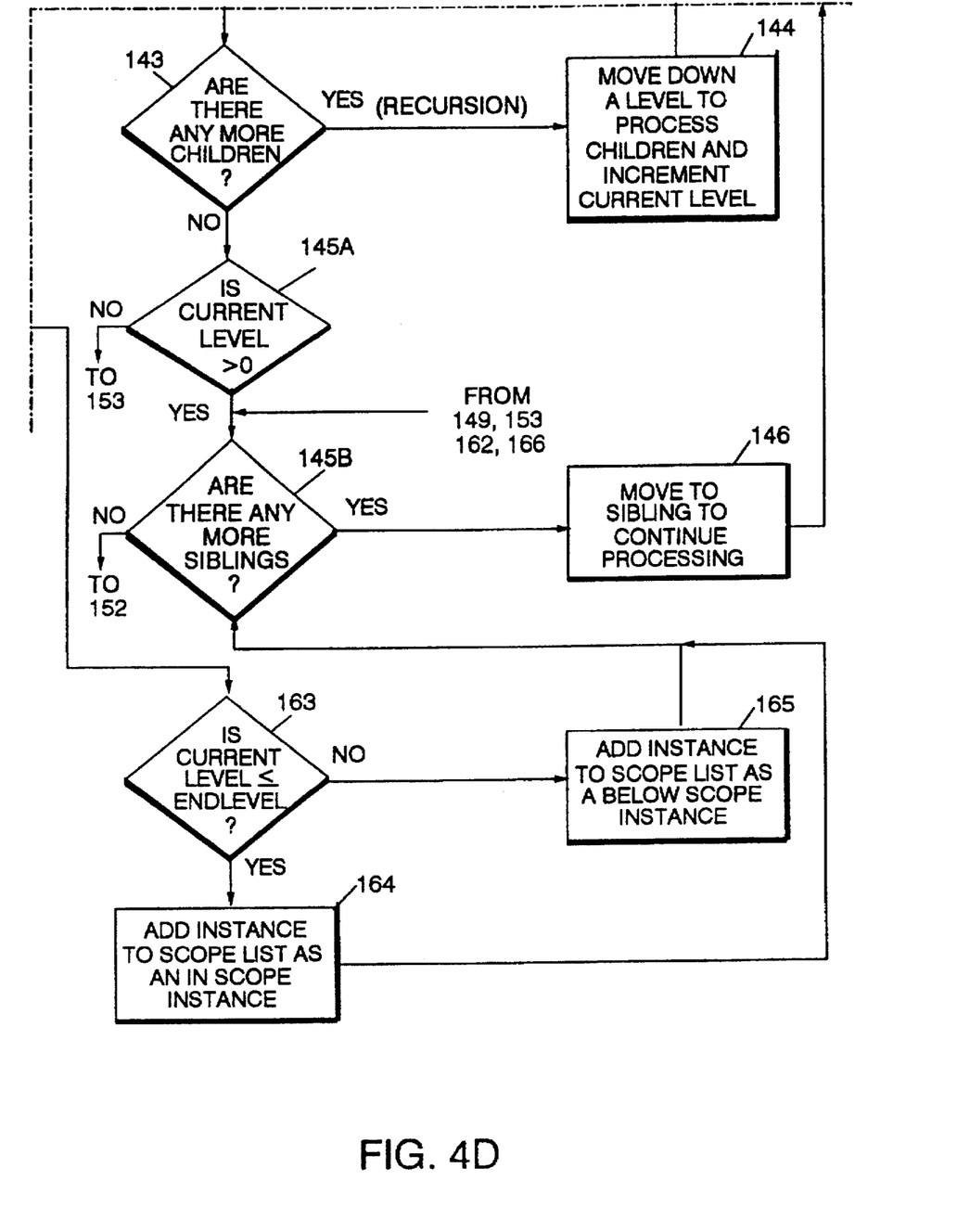

FIG. 4 shows the scoping process, or logical operation, contained within platform 24 to handle general messages, including deletes, which can refer to a scoped collection of instances. The scoping process in platform 24 receives a message in step 131. The message could be a delete request, a GET request, a SET request or an action. In step 132, the message is parsed, or broken up into its component parts, to pull out the scope information from the message. The scope information includes the scope type, the start level, the end level, and the base MOI (BMOI). BMOI is the reference point MOI in the tree for the scope of the request. Scope type indicates in a coarse way how much of the tree this scope is going to cover. Five scope types are legal: base object (BMOI) only, first level only, whole sub-tree, a specific level below the base, or, from the base down to a specific level. The start level and the end level are in addition to the scope type. If the scope type indicates a specific level, then the start level and end level are both set to that specific level. If the scope type indicates everything from the base MOI down to a specified level, the start level would be 0 and the end level would be the specified level.

The base MOI refers to the starting point in the tree or naming hierarchy. Setting the base MOI to a particular child that is, for example, 4 levels below the root of the tree, cuts out a large part of the tree. Once the BMOI has been specified, all of its peers as well as its parents, cannot be referred to. Only the BMOI itself and its children can be referred to. The process includes a set of defaults if all of the scoping information is not specified. For example, a GET request sent without scoping information is sent only to the base MOI. There is no default value for the base MOI. It must be specified in the request.

In step 133, the base MOI (BMOI) is located in the tree. If the BMOI is not found as checked by decision 134, the process reports an error to the originator in step 135. Operation 136 checks whether only the BMOI was scoped, either because the scope type was BMOI only, or because the start level and end level were both set to zero, or if the scope type specified a specific level below the base and the level specified was zero. If only the BMOI was scoped, decision 138 checks if the message is a delete message. If not, the request is sent up in step 139 to the BMOI, which does its own processing. The platform process is finished as far as scoping is concerned.

If the message was a delete, then decision 140 checks the name binding of the BMOI to determine whether the BMOI is deletable. If the BMOI is not deletable, then operation 142 sends an error message back to the requester, indicating that there was nothing that could be deleted. If the BMOI is deletable, then step 141 sends a delete message up to the BMOI. The BMOI goes through its processing to delete itself, which includes deregistering with the platform.

If decision 136 indicated that more than just the base level was scoped, step 137 checks whether the current level is below the level of the BMOI. Take, for example, the case where the scoping was set to first level only, so that the start level is 1. The first time 137 is reached, the current level is 0. Since the current level is 0 and the start level is 1, current level is not greater than or equal to start level, so the process goes to step 143, which checks to see if there are any children. If there aren't any children, step 145A tests whether the current level is greater than 0. Since the current level is 0, the process branches to decision option 153.

Step 153 checks whether the BMOI is being looked at. If it is, step 154 checks whether there are any instances on the scope list. If there are no instances on the scope list, step 155 sends an error back to the requester indicating there was nothing in the scope. If in decision box 154 there are any instances on the list, the message (GET, SET, delete) is sent to all of the instances on the list by operation 156.

If, in step 153, the BMOI level was not reached, then decision 153B checks whether the message was a delete message and the current level is greater than or equal to the start level. If both of these conditions are met, process branches to operation 158 to test whether the instance is deletable. If either of these conditions are not true, process branches to decision 145B to look for siblings.

Returning to step 143, if there are children, operation 144 increments the current level, moving down to process the children. The process then moves back to step 137. If the current level is greater than or equal to the start level, step 147 checks whether the message is a delete message. If not, the instance is added to the list of instances by operation 148. Step 149 checks if there are any children of the instance just added. If not, decision 145 checks if there are any siblings. If there are children detected in decision 149, then step 150 increments the level and moves down to process the children. Decision 151 checks if the current level is less than or equal to the end level. If so, then this instance is added to the scope list in step 148 and decision 149 checks if it has any children. The process loops through these steps until the end level is exceeded at decision 151. The process then moves to step 152. Step 152 returns up a level, to the parent of the last instance processed and decrements "current level". Decision 153 checks whether the parent is the BMOI, and process continues as above.

Step 145B determines whether the instance has any siblings. If it has a sibling, step 146 moves to the sibling. Decision 137 checks to see whether the current level is greater than or equal to the start level. If so, the process moves to step 147 as described above. The process proceeds through these loops until all of the children and siblings are processed and added to the scope list.

The recursion beginning at step 150, the unrecursion at step 152, and the processing of siblings at step 146, collect all of the instances in the hierarchy and within the scope for a non-delete request. Eventually the BMOI will be reached at decision 153. Step 154 checks whether there are any instances on the scope list. If so, operation 156 sends the message to the scoped instances. If not, step 155 returns an error message.

Returning to decision 147, if the message is a delete request, the process moves to step 157, which checks whether there are any children. Unlike nondelete messages, a deleted instance cannot be added to the scope list as the process goes along. This is because if an instance is deleted, then all of its children must also be deleted. Step 144 moves down a level to process the children first. The process continues recursing down until the bottom child is reached. At this point, step 158 checks if that particular instance is deletable. If it is deletable, then decision 163 checks if the current level is less than or equal to the end level. Regardless of whether the process is past the end level or not, all of those instances must be deleted as children of a deleted instance. If the current level is greater than the end level, step 165 adds the instance to the scope list as a below scope instance. What that indicates is that the instance is going to be deleted, but because its not actually in the scope, the manager did not want to be told that it went away. Step 165 flags this instance as being a below scope instance. If in step 163, the current level was less than or equal to the end level, step 164 adds the instance as an in scope instance. That means that not only is it going to be deleted, but the manager is going to be told that it was deleted. The manager is told because the MOI is within the scope of the tree that the manager indicated. All of the MOIs which are deleted send a response, and the agent filters out the responses which come from below scope instances.

After the end child instance is added to the scope list, step 145B checks for siblings to the end child. If there are any siblings, step 146 moves to the siblings and processes them. Step 137 moves to step 147 down to step 157, which checks to see if the sibling has any children. As above, the process recurses down to the last child of this sibling and processes it.

Returning to step 158, if this instance was not deletable, step 159 marks the parent as undeletable. Next, step 160 marks the current instance as undeletable. Decision 161 then checks if the current level is equal to the end level, meaning the lowest instance that falls within the scope. This test is necessary because if a lowest scope parent is undeletable, its children should not be deleted. In step 162, children which are already on the scope list are removed from the scope list when a lowest in-scope parent is found to undeletable.

It is also important not to delete the parent of an undeletable instance. Therefore, as the process recurses back up through the levels of the tree, step 159 marks each parent having undeletable children as also undeletable.

Returning to step 161, if the current level is not equal to the end level, then decision 166 tests whether the current level is greater than the end level. If it is, step 152 return up a level to the parent, decrements the current level, and continues processing. If the current level is not greater than the end level, then step 145 looks if there are any siblings.

This is how the process recurses back up the tree in a case where there's an instance that's not deletable. Eventually, decision 153 will find that the process has reached the BMOI. Step 154 checks the scope list, and either step 156 send the message to the instances on the scope list or, if there are no instances, step 155 sends an error message.

Figure 5:
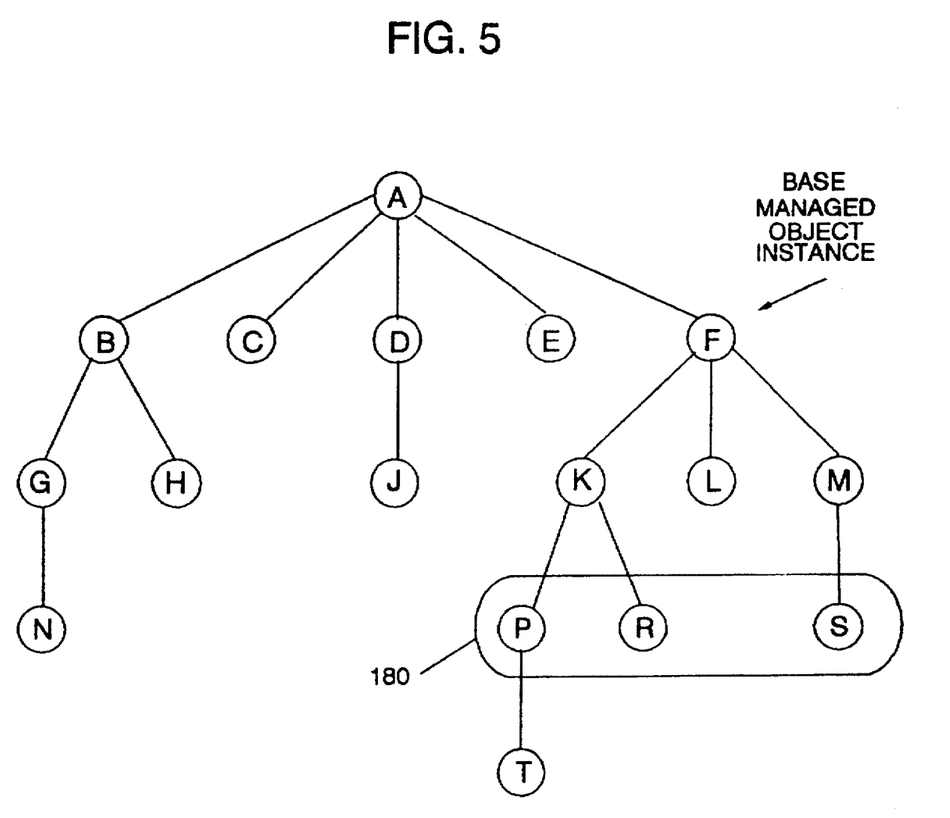
FIG. 5 is an example of an MOI tree.

FIG. 5 shows an example of a tree. Following the flow diagram of FIG. 4 using this tree illustrates one example of the operation of the invention. The oval 180 indicates the instances selected by the scope information in the message. In this example, the BMOI is F, and the scope type is specific level 2 below the BMOI. (The formal name of an MOI indicates its ancestry. Thus, instance F's formal name is A.F.) Assuming the message is delete, the following instances would be deleted: P, T, R, and S. Assume for this example that S is not deletable.

Referring to FIG. 4, the process would proceed as follows. Step 131 receives the message, and step 132 parses it. Step 133 finds the BMOI, F. Decision 134 indicates that the BMOI was found. The scope is more than the BMOI, so decision 136 branches to decision 137. Decision 137 checks whether the current level is greater than the start level. The current level is 0, and the start level is 2, so the process branches to decision 143. F does have children, so step 144 moves down to K, the leftmost node on level 1. In decision 137, the current level (1) has not reached the start level (2), so decision 143 checks whether K (the leftmost child of F) has children. K has children, so step 144 moves to P on level 2. Now the current level has reached the start level. Decision 137 branches to decision 147, which checks if this is a delete message. Since it is, step 147 checks whether P (the leftmost child of K) has children. P has a child T, so step 144 moves down to level 3. Decision 137 passes through decision 147 as before to decision 157. This time, T does not have children. Decision 158 checks whether T is deletable. It is, so process passes to decision 163. Decision 163 checks whether the current level (3) is less than or equal to the end level (2). It is not, so operation 165 adds T to the scope list flagged as a below scope instance.

Next, decision 145B checks whether T has any siblings. It does not, so step 152 unrecurses back up a level to P at level 2. Decision 153 checks whether P is the BMOI. It is not, so decision 153B checks whether this is a delete message, and the level is greater than or equal to the start level. Both of these conditions are met, so process passes to decision 158, which checks if P is deletable. It is, so decision 163 checks whether P is less than or equal to the end level, 2. P is at the end level, so operation 164 adds P as an in scope instance. Decision 145B checks whether P has siblings.

P has leftmost sibling R, so step 146 moves to R. Process passes through decision 137 and 147 to decision 157. R has no children. In decision 158, R is deletable. In decision 163, the current level is the end level, so R is added to the scope list flagged as an in scope instance in step 164. Decision 145B checks whether R has any siblings to its right. It does not, so step 152 moves up to K on level 1. This is not the BMOI per decision 153, and the level is not greater than or equal to the end level in decision 153B, so decision 145B checks whether K has siblings to its right. It does, so step 146 moves to L to continue processing.

Now, current level (1) is less than the start level (2) in decision 137. Therefore, decision 143 checks whether L has any children. It does not, so decision 145 checks for siblings. L has sibling M, so step 146 moves to M. Current level is less than start level in decision 137, so decision 143 checks for children. M has child S, so step 144 moves down to process S. Now the current level (2) equals the start level (2) in decision 137, so 147 tests whether the message is delete. It is, so step 157 checks whether S has children. It does not, so decision 158 determines whether S is deletable. In this example, S is undeletable. Operation 159 marks parent M as undeletable, and operation 160 marks this instance S as undeletable. In decision 161, the current level is the end level so operation 162 removes all children of M and S from the delete list score (nothing additional in this case). Operation 145B checks for further siblings to the right of S, of which there are none. Step 152 moves up to level 1. Level 1 is not the BMOI in decision 153, and the level is less than the start level in decision 153B, so decision 145B checks for siblings of M. There are none remaining to the right of M. Thus, step 152 moves up to F on level 0. Now, the process has reached the BMOI in decision 153, so step 154 checks whether there are any instances on the scope list. There are, so step 156 send delete messages to T, P, and R. This completes the operative example.

While the exemplary preferred embodiments of the present invention are described herein with particularity, those having normal skill in the art will recognize various changes, modifications, additions and applications other than those specifically mentioned herein without departing from the spirit of this invention.

What is claimed is:

1. A method, resident in an agent platform, for scoping managed object instances (MOIs) to receive a message from a manager application, said message specifying a portion of a tree containing the MOIs to receive the message, the method comprising the steps of:

maintaining, at the agent platform, said tree in a current and an accurate state;

receiving at the agent platform the message from the manager;

from the message determining at the agent platform the specified tree portion;

recursing by the agent platform through the tree within and adjacent to the tree portion to find which MOIs should receive the message;

generating, at the agent platform, a scope list comprising the MOIs which should receive the message;

sending a message from the agent platform to the MOIs which should receive the message as determined from said generating step, thereby permitting the MOIs to process said message without having to know of the presence or absence of other MOIs;

wherein the message from the manager is delete, and MOIs are only added to the scope list if they are deletable.

2. The method of claim 1 wherein the children of MOIs to be added to the scope list are added to the scope list if said children are deletable.

3. The method of claim 2 wherein an MOI is not deletable if it is flagged not deletable or if it has any children which are not deletable.

4. Apparatus within an agent platform, for scoping managed object instances (MOIs) to receive a message from a manager in a manager application, said message specifying a scope portion of a tree containing the MOIs to receive the message, the apparatus comprising:

a receiver in the agent platform receiving the message from the manager;

a processing module in the agent platform determining the specified tree portion;

a recusor in the agent platform recursing through the tree within and adjacent to the tree portion to find which MOIs should receive the message;

a list generator in the agent platform generating a scope list comprising the MOIs which should receive the message;

a transmitter sending a message from the agent platform to the MOIs which should receive the message as determined by said processing module, thereby permitting the MOIs to process said message without having to know of the presence or absence of other MOIs;

wherein the message from the manager is delete; and the list generator only adds MOIs to the scope list if they are deletable.

5. The apparatus of claim 4 wherein the generating means adds the children of MOIs to the scope list only if said children are deletable.

6. The apparatus of claim 5 wherein an MOI is not deletable if it is flagged not deletable or if it has any children which are not deletable.

7. A method, resident in an agent platform, for scoping managed object instances (MOIs) within a tree to receive a message from a manager in a manager application, said message specifying the base MOI and the levels below the base MOI containing MOIs to receive the message, the method comprising the steps of:

receiving the message at the agent platform from the manager;

parsing the message by the agent platform to find the specified base MOI and levels below the base MOI;

finding, by the agent platform, the base MOI within the tree;

recursing down each branch of the tree in the agent platform below the base MOI to the bottom of the tree and unrecursing back up to find which MOIs should receive the message;

generating in the agent platform a scope list comprising the MOIs which should receive the message;

sending a message from the agent platform to the MOIs on the scope list;

sending an error message from the agent platform to the manager if the scope list is empty; and wherein if the message is delete;

while recursing through tree, determining which MOIs are flagged undeletable;

while generating the scope list, omitting MOIs which are flagged undeletable and omitting the children of MOIs which are flagged undeletable.

* * * * *